United States Patent [19]
Vann

[11] 4,041,738
[45] Aug. 16, 1977

[54] LOCKING DEVICE FOR OUTBOARD MOTOR

[76] Inventor: Stephen R. Vann, 20160 Van Owen, Canoga Park, Calif. 91306

[21] Appl. No.: 684,553

[22] Filed: May 10, 1976

[51] Int. Cl.[2] .......... F16B 41/00
[52] U.S. Cl. .......... 70/212; 70/232; 70/DIG. 58
[58] Field of Search .......... 70/212, 232, 230, DIG. 58, 70/56, 58, 63, 52, 53, 178, 229, 211, 423, 455, 199, 200

[56] References Cited

U.S. PATENT DOCUMENTS

| | | | |
|---|---|---|---|
| 1,663,260 | 3/1928 | Mould | 248/4 |
| 2,479,300 | 8/1949 | Binz | 70/232 |
| 2,529,432 | 11/1950 | Tenner | 70/232 |
| 2,556,900 | 6/1951 | Buschhorn | 70/230 |
| 2,706,900 | 4/1955 | Johnson | 70/178 |
| 3,025,028 | 3/1962 | Corbin | 248/4 |

FOREIGN PATENT DOCUMENTS

| | | | |
|---|---|---|---|
| 135,412 | 1/1952 | Sweden | 70/232 |

*Primary Examiner*—J. Franklin Foss
*Attorney, Agent, or Firm*—Robert E. Geauque

[57] ABSTRACT

A locking device for an outboard motor having a C-shaped mounting bracket fitting over the back transom of a boat and containing a mounting screw with a handle at one end for tightening a foot at the other end against the transom, said locking device having a first member with two angular arms, one of which is secured against the transom by the foot of the mounting screw and the other arm locked to a second member having a handle restraining portion located adjacent the handle to prevent rotation of the handle.

12 Claims, 7 Drawing Figures

*Fig. 1.*
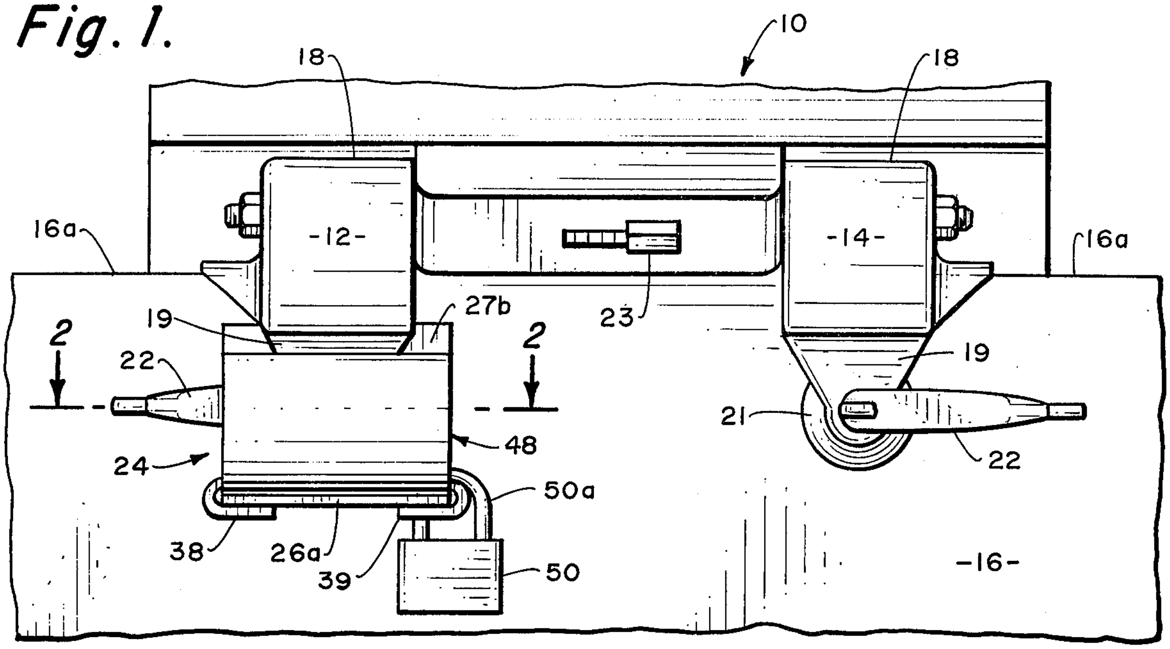
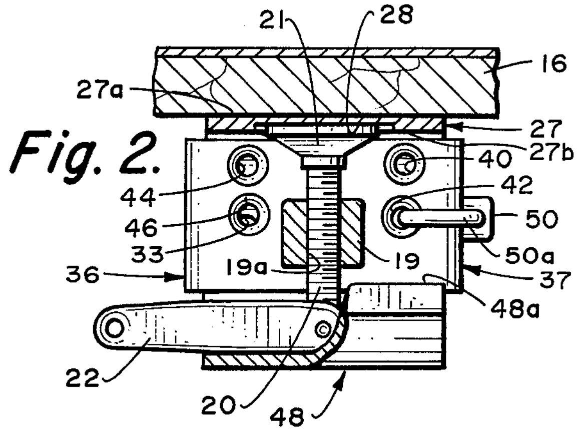
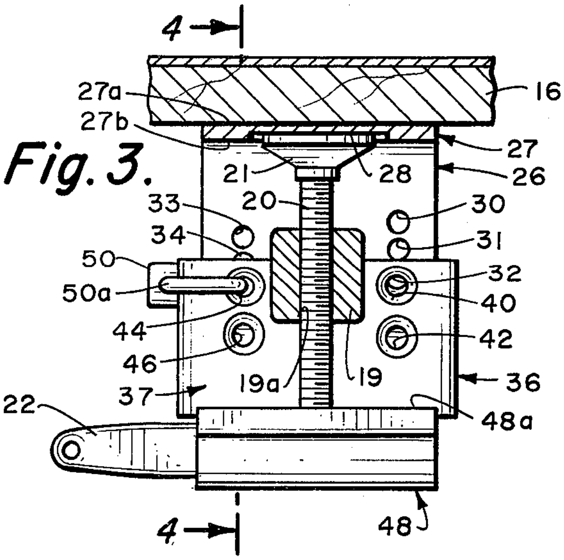
*Fig. 6.*
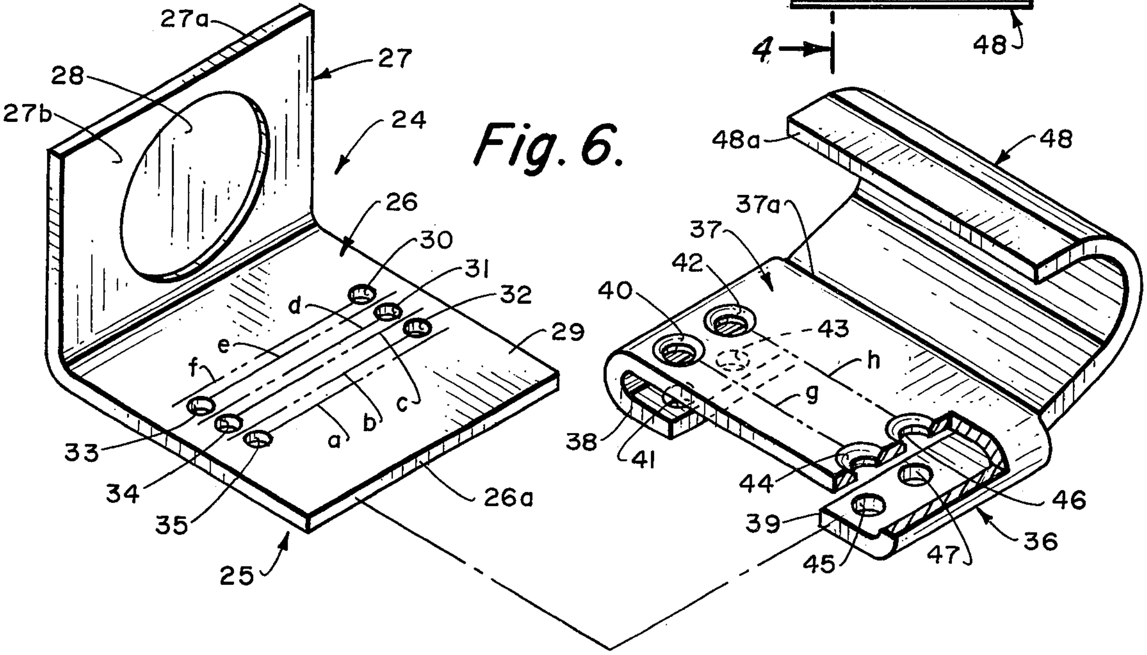

LOCKING DEVICE FOR OUTBOARD MOTOR

BACKGROUND OF THE INVENTION

Outboard motors are usually mounted on the transom of a boat by means of a pair of C-shaped brackets which are placed over the transom and are secured to the transom by tightening a mounting screw in each bracket. Each screw has a flat foot end which is pressed against the transom to secure the motor exteriorly of the transom in position for propelling the boat. Outboard motors are left on boats while the boats are not in use because of the weight of the motor and the awkwardness of handling. Often times, a motor is stolen from the boat when the owner of the boat is not in the vicinity. Also, during storage of an outboard motor in a boat house, the motor is often mounted upon a supporting structure simulating the back transom of a boat and the motor can be removed by an unauthorized person by simply untightening the mounting screws and lifting off the motor. Also, loosening of the mounting screws can occur due to vibration of the motor during operation.

Attempts have been made to provide locking devices for the mounting screws to prevent their rotation so that a motor cannot be removed from the boat or become loose on the boat. The handle of the mounting bolt opposite the foot end usually comprises a lever which slides back and forth relative to the bolt or a lever which can be rotated from one side to the other in order to permit the bolt to be tightened by half rotations of the handle. Also, the mounting bolt can have a shorter handle rigidly fixed to the head end of the bolt and extending to opposite sides of the bolt.

Devices of the type designed to prevent rotation of the handles of the mounting screws have been based on the principle that the handles of both screws must be protected by a single device against rotation. Thus, the single device must be adjustable to prevent rotation of handles which are of different construction and located on different types of motors at different distances apart. Therefore, the devices have been far too complex and costly, particularly when utilized on very small motors that only have one C-shaped bracket for mounting the motor on the boat. A single locking device which locks two mounting screws at the same time often cannot be applied to just one mounting screw and therefore is not useable with very small motors.

Examples of such locking devices which provide a single device for locking both of the mounting screws are found in U.S. Pats. to Binz No. 2,479,300; Tenner No. 2,529,432; and Pavek No. 3,505,839. All of these patented devices are complicated in design since, in a single device, they protect two of the mounting screws against being unloosened.

SUMMARY OF THE INVENTION

The present invention utilizes individual locking devices for the individual mounting bolts or screws. Each individual locking device has two members, one of which has an upright arm which is located against the back transom and contains a circular recession which receives the foot of the mounting screws. The second member has a curved portion which surrounds the handle of the mounting screw to prevent rotation of the handle when the two members are connected together by a padlock. Locking of the motor with the individual device is easier to accomplish since it does not require an elongated device which covers both handles of the mounting screws. One locking device can be used to lock each mounting screw for any motor because the operation of the devices are independent of the distance between the mounting screws or the number of mounting screws. In the prior devices, only a limited amount of adjustment is available to compensate for different distances between mounting screws.

The curved end portion of the second member can be applied around handles which are slideable through a hole in the screw or are pivotable from one side to the other or are securely attached to the outer end of the mounting screw. This versatility is not present in the prior art since many locking devices depend upon a particular handle construction of the mounting screws.

Since the first member of the locking device has an upright arm flat against the boat transom, the device will not mar the transom since it is not otherwise attached to the transom. The foot of each mounting screw is in a recession in the upright arm so that all of the tightening force applied to the C-shaped bracket is taken up between the foot and the upright arm and not against the transom surface. Also, by placing the foot of the mounting screw in the recession, the position of the mounting screw cannot be moved relative to the transom after the screw is tightened. Since the locking devices are not permanently affixed to the boat, they are easily placed along the boat transom to cover the handles of mounting screws regardless of the distance apart by which they are located. The individual locking device of the present invention is not as costly to produce because there is no extension across the space between two mounting screws.

BRIEF DESCRIPTION OF THE DRAWINGS

FIG. 1 is a side elevational view showing the C-shaped brackets for attaching a motor to the transom of a boat, with a locking device on one of the mounting screws and not on the other;

FIG. 2 is a horizontal section along line 2—2 of FIG. 1 illustrating a padlock connecting the two members of the locking device together;

FIG. 3 is a horizontal section similar to FIG. 2 showing the members of the locking device in an extended position;

FIG. 6 is an expanded perspective of the two members of the locking device and illustrating the hole alignment.

BRIEF DESCRIPTION OF THE PREFERRED EMBODIMENT

Figure 4:
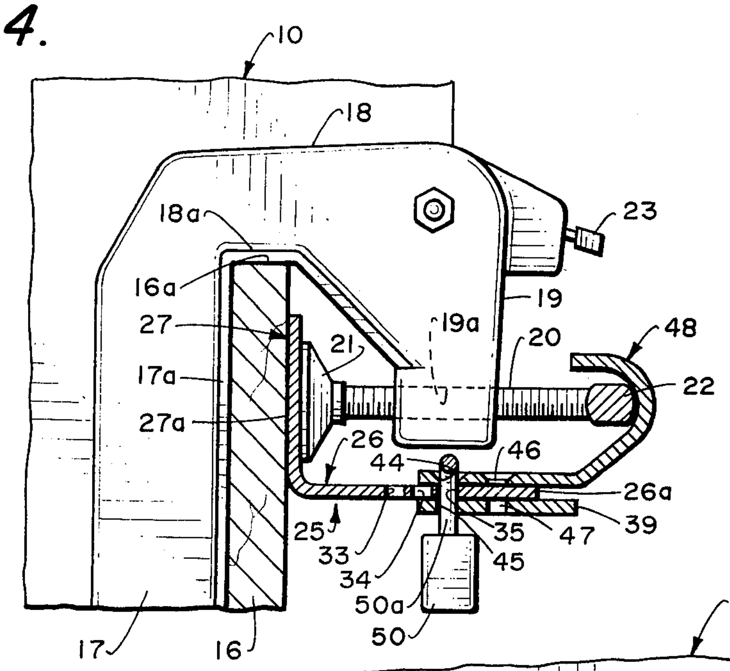
FIG. 4 is a vertical section along line 4—4 of FIG. 3 illustrating the handle covered by the curved end portion of the second member.

Referring to FIG. 1, a motor 10 has integral therewith two C-shaped mounting brackets 12 and 14. Each of the C-shaped brackets receive the edge 16*a* of transom board 16 which forms the back of the boat. Arm 17 of each mounting bracket 12, 14 (see FIG. 4) has a surface 17*a* which bears against the outer surface of the transom board 16 and arm 18 has an upper surface 18*a* engaging top edge of the transom 16*a*. Arm 19 of the mounting bracket has a threaded opening 19*a* at its end which receives a motor mounting screw 20 having a foot 21 at one end and a handle 22 at the other end. Without the locking device of this invention, the motor could be mounted on the transom by simply screwing the mounting screw 20 until foot 21 firmly engages the outside surface of the transom 16. However, there would be no means of preventing an unauthorized user or thief from removing the motor from the boat or from a mounting board on which it was stored. A throttle lever 23 is provided on the motor in order to control the speed of the motor 10.

Handle 22 is pivoted at the end of each mounting screw 20 so that it can move from one side of the screw to the other to facilitate the tightening of the screw without having to turn the handle through to 360°. Another type of handle slides through an opening in the end of the screw rather than pivoting on the end of the screw. Locking device 24 of the present invention is utilized to lock each of the mounting bolts 20 for the C-shaped mounting brackets against rotation. Each locking device comprises a first member 25 having two angularly positioned arms 26 and 27. A normally upright side 27*a* of arm 27 can be positioned against the transom board and opposite side 27*b* contains a circular recession 28 to receive foot 21 of screw 20 when the screw is tightened. Arm 26 is normally horizontal and contains locking openings comprising a first set of three openings 30, 31 and 32 on one side and a second set of three openings 33, 34 and 35 on the other side. Second member 36 of locking device 24 comprises a first flat portion 37 having openings 40 and 42 on one side and openings 44 and 46 on the other side and the first portion 37 has rolled-over edges 38 and 39. Edge 38 contains openings 41 and 43 aligned with openings 40 and 42, respectively, and edge 39 contains openings 45 and 47 aligned with openings 44 and 46. A curved handle restraining portion 48 extends from edge 37*a* of portion 37 outwardly and upwardly until the top edge 48*a* is substantially above the top of edge 37*a* of portion 37.

As illustrated in FIG. 6, the holes in arm 26 are staggered with the center line of hole 32 falling between holes 34 and 35, the center line of the hole 34 falling between holes 31 and 32, etc. The staggering of the holes is clearly illustrated by the dash lines *a* through *f* in FIG. 6. However, in member 36, the holes 40, 41 and 44, 45 are in alignment as are the holes 42, 43 and 46, 47 as illustrated by the dash lines *g* and *h* in FIG. 6. The holes 40 and 42 are located apart the distance between openings 30 and 32 and the holes 44 and 46 are located apart the distance between holes 33 and 35 for reasons later described. This arrangement of holes will permit alignment of one of the hole pairs of member 36 with one of the holes in the member 25, so that the clasp arm of padlock 50 can be inserted through all three aligned holes in members 25 and 36. The plurality of holes provide for different distances between the curve portion 48 and the upright arm 27.

In applying the locking device 24 to one of the C-shaped brackets to prevent turning of the mounting screw 20, the upright arm 27 of member 25 is first placed against the inside of the transom 16 and the screw 20 is tightened down until the foot 21 enters the recession 28 and forces the arm 27 against the surface of the transom. The edge 26*a* of arm 26 is inserted into the groove between portion 37 and the rolled-over edges 38 and 39 until the curved portion 48 is adjacent the handle 22 when the handle is in its horizontal position. Only slight movement of the member 36 relative to the member 25 is thereafter required to place one of the pairs of holes in the member 36 in alignment with one of the openings in the member 25. The members can be locked together by placing the clasp 50*a* of padlock 50 through the holes in the members 25 and 36.

In FIG. 2, the holes 42 and 43 of member 36 are aligned with the hole 30 in the member 25 so that curved end 48*a* is in its closest position to the upright arm 27. As illustrated, a portion of the hole 33 can be observed through hole 46 in portion 37 and only the arm 26 is observed through the outer holes 40 and 44. Referring to FIG. 3, the holes 44, 45 in member 36 are aligned with hole 35 in member 25 in order to place curved end 48*a* the farthest possible distance from upright arm 27 after the padlock is inserted. In FIG. 2, the handle 22 is above plate portion 26 but in FIG. 4, the screw is long enough that handle 22 is beyond edge 26*a* so that the handle can be rotated clear of the edge 26*a* and it is not necessary to pivot the handle from side to side to tighten the screw.

Figure 5:
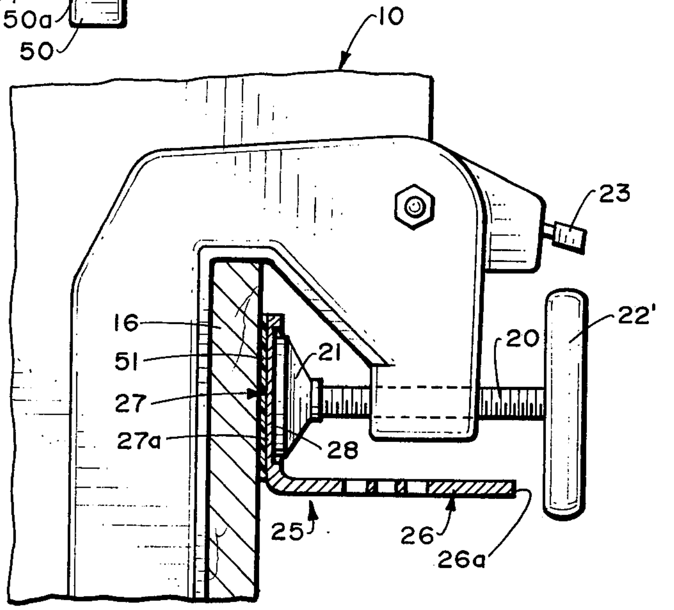
FIG. 5 is a vertical section similar to FIG. 4 of a modification having a rigid handle on the end of a mounting screw.
Figure 7:
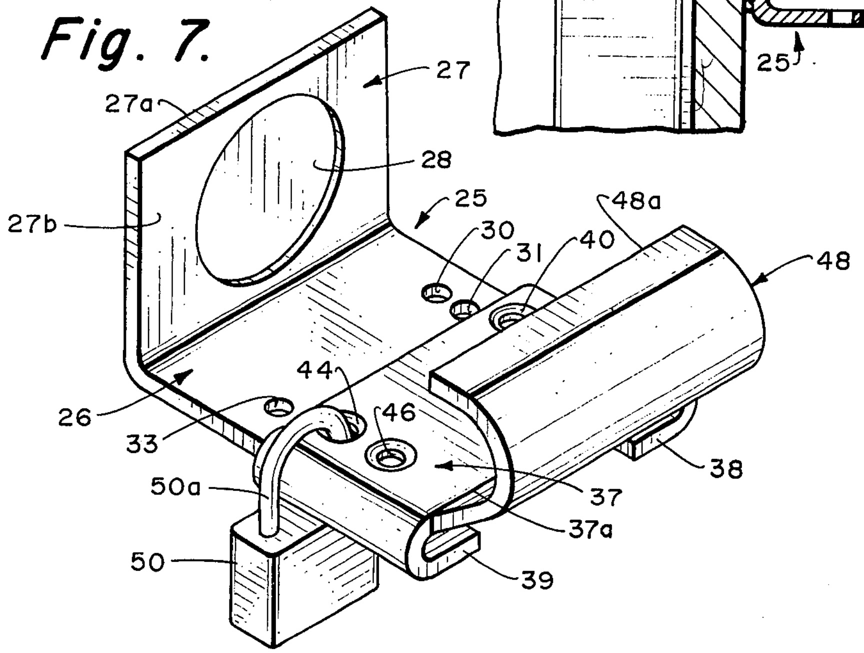
FIG. 7 is a perspective of the locking device with the members locked together by a padlock.

In FIG. 5, a modified handle 22′ is rigidly connected to the end of mounting screw and extends to equal distances on opposite sides of the screw. Screw 20 is of sufficient length so that handle 22′ can be rotated completely through 360° during tightening and still miss the edge 26*a* of the member 26. When the handle 22′ is placed in the final horizontal position, member 36 can be slid into the member 25 as illustrated in FIG. 4 and holes are placed in alignment to lock the handle 22′ even though it extends beyond the edge 26*a* of the plate 26.

Since foot 21 goes into the recess 28 of arm 27, the locking device cannot be moved sideways away from the C-shaped mounting bracket in order to defeat the locking of the screw. After the padlock is attached, the handle of the mounting screw cannot be moved within curved portion 48. The foot is fixed after it engages the recession 28 and the foot simply rotates in the pad as the mounting bolt is finally tightened. It should be understood that the surface 27*a* of the upright arm 27 which bears against the transom can have a rubber pad 51 on the bearing surface in order to protect the boat surface. The series of holes in member 25 and the mating holes in the member 36 are utilized as a means of providing a large number of adjustable positions for the curved end 48. However, it is understood that other mechanisms can be provided for locking the members together in different relative positions. The locking device is applicable to different motors because it can restrain various types of handles on various lengths of screws.

What is claimed is:

1. A locking device for an outboard motor having a C-shaped mounting bracket fitting over the back transom of a boat and containing a mounting screw with a handle at one end and a foot at the other end, said locking device comprising:

a first member having two angularly positioned arms, one of said arms extending outwardly from said transom and the other of said arms being held adjacent said transom by said foot;

a second member having a first portion, a handle restraining portion extending from said first portion and shaped to prevent rotation of said handle; guide means for slidably connecting said first portion of said second member and said one arm of said first member; and lock means for securing said one arm to said first portion in various relative positions, said lock means locking said members together in a relative position with said other arm adjacent said transom and said restraining portion adjacent said handle to prevent rotation of said handle.

2. A locking device as defined in claim 1:

said lock means comprising a first set of openings in said one arm and a second set of openings in said first portion, said first and second sets of openings being positioned to align different openings in each set at different relative locations of said other arm from said curved portion; and means insertable into aligned openings for locking said members in said relative position.

3. A locking device as defined in claim 2 wherein said insertable means comprises a clasp of a padlock.

4. A locking device as defined in claim 1:

said restraining portion comprising a curved surface for partially receiving said handle.

5. A locking device as defined in claim 1:

a depression in said other arm for receiving said mounting screw foot when said screw is tightened.

6. A locking device as defined in claim 1:

said other arm being normally upright and said restraining portion being curved outwardly and upwardly away from the edge of said first portion located furtherest from said other arm and then inwardly toward said other arm.

7. A locking device as defined in claim 1:

said guide means comprising rolled-over edges on said first portion to form a groove for slidably receiving said one arm.

8. A locking device as defined in claim 1 wherein the length of said one arm is shorter than the length of said mounting screw to permit said handle to rotate past the end of said one arm.

9. A locking device as defined in claim 1:

said other arm having a layer of padding on the surface opposite said transom.

10. A locking device for an outboard motor having a C-shaped mounting bracket fitting over the back transom of a boat and containing a mounting screw with a handle at one end and a foot at the other end, said locking device comprising:

a first member having two angularly positioned arms, one of said arms extending outwardly from said transom and the other of said arms being held adjacent said transom by said foot;

a second member having a first portion, a handle restraining portion extending from said first portion and shaped to prevent rotation of said handle; guide means for slidably connecting said first portion of said second member and said one arm of said first member; and lock means for securing said one arm to said first portion in various relative positions, said lock means locking said members together in a relative position with said other arm adjacent said transom and said restraining portion adjacent said handle to prevent rotation of said handle;

said restraining portion comprising a curved surface for partially receiving said handle; and said guide means comprising rolled-over edges on said first portion to form a groove for slidably receiving said one arm.

11. A locking device as defined in claim 10:

a depression in said other arm for receiving said mounting screw foot when said screw is tightened.

12. A locking device as defined in claim 11:

said lock means comprising a first set of openings in said one arm and a second set of openings in said first portion, said first and second sets of openings being positioned to align different openings in each set at different relative locations of said other arm from said curved portion; and means insertable into aligned openings for locking said members in said relative position.

* * * * *